United States Patent

Amidon et al.

[15] 3,674,824

[45] July 4, 1972

[54] LONG CHAIN HYDROCARBON DITHIOCARBAMATE ACCELERATORS AND METHOD OF MAKING SAME

[72] Inventors: Roger W. Amidon, Oxford; Richard A. Gencarelli, Cheshire, both of Conn.

[73] Assignee: Uniroyal, Inc., New York, N.Y.

[22] Filed: Sept. 9, 1970

[21] Appl. No.: 70,935

[52] U.S. Cl. ............ 260/429 K, 260/79.5 C, 260/94.3, 260/94.4, 260/94.6, 260/429.7, 260/429.9, 260/431, 260/435 B, 260/438.1, 260/438.5 R, 260/439 R, 260/440, 260/446, 260/447, 260/567, 260/607 R
[51] Int. Cl. ............ C07f 3/06, C07f 3/08, C07f 15/02
[58] Field of Search ............ 260/429.9, 429, 429 K, 567, 260/438.1, 438.5, 439 R

[56] References Cited

UNITED STATES PATENTS

| | | | |
|---|---|---|---|
| 2,265,851 | 12/1941 | Matheson | 252/48 |
| 2,366,539 | 1/1945 | McCleary et al. | 252/47 |
| 2,492,314 | 12/1949 | Olin | 260/429 |
| 2,693,447 | 11/1954 | Karll | 252/32.7 |
| 2,794,781 | 6/1957 | Diamond et al. | 252/33.6 |
| 3,355,472 | 11/1967 | Remes et al. | 260/446 |

FOREIGN PATENTS OR APPLICATIONS 948,504   2/1964   Great Britain

OTHER PUBLICATIONS

Cambi et al., Chem. Abst., 1932, p. 5463

*Primary Examiner*—Tobias E. Levow
*Assistant Examiner*—A. P. Demers
*Attorney*—James J. Long

[57] ABSTRACT

Long chain hydrocarbon dithiocarbamate accelerators such as zinc N-dodecyl-N-isopropyldithiocarbamate useful in the sulfur cure of blends of EPDM with highly unsaturated rubbers such as SBR, NR, etc. In making the accelerators high speed agitation is employed in the salt-forming step to obtain small particle size salt substantially free from entrapped or occluded impurities.

35 Claims, No Drawings

LONG CHAIN HYDROCARBON DITHIOCARBAMATE ACCELERATORS AND METHOD OF MAKING SAME

CROSS REFERENCE TO RELATED APPLICATION

Use of the herein disclosed accelerators in the sulfur cure of rubber blends is the subject of copending application Ser. No. 70,936 of Mastromatteo and Brett, filed of even date herewith.

BACKGROUND OF THE INVENTION

1. Field of the Invention

This invention relates to new accelerators of sulfur vulcanization and a method of making same.

2. Prior Art

The conventional metal dialkyldithiocarbamate accelerators have not had the long hydrocarbon chains which characterize the present accelerators and have not been made using high speed agitation as in the present process. Dialkyl substituted dithiocarbamates are well known to the art and have been used as accelerators, stabilizers and agricultural chemicals. Usually the alkyl groups are methyl, ethyl, tertiary butyl or cyclohexyl. Higher alkyl substituted dithiocarbamates are suggested in U.S. Pat. No. 3,236,804, Feb. 22, 1966 and U.S. Pat. No. 3,318,841, May 9, 1967 (Sun Oil) but secondary alkyl substitution is neither shown nor mentioned. British Pat. No. 875,601 (Imperial Chemical Industries) shows the use of zinc dithiocarbamates with alkyl groups of two or more carbon atoms or cycloalkyl groups. Belgian Pat. No. 611,660, June 18, 1962 (Hoechst) demonstrates the use of metal dihydrocarbyl dithiocarbamates as antistatic agents where the alkyl may preferably have one carbon atom. British Pat. No. 990,633, Apr. 28, 1965 (ICI) uses zinc dinonyl and didodecyldithiocarbamates as additives in polyurethanes. French Pat. No. 1,384,215, Jan. 1, 1965 (Eastman Kodak) teaches the use of zinc dialkyldithiocarbamates with alkyl groups from three to 20 carbon atoms particularly tert.-butyl. Tulyupa et al. in Zh. Neorg. Khim. 1968, 13(8), p. 2,058–61 have determined the stability of mercury dithiocarbamates where R is H and R' is an alkyl group.

SUMMARY OF THE INVENTION

In accordance with the invention new long chain hydrocarbon dithiocarbamate accelerators are provided, by a method involving high speed agitation.

DETAILED DISCLOSURE

The new chemicals of the invention are long chain hydrocarbon dithiocarbamates of the formula

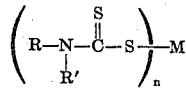

where M is a metal (e.g., zinc, tellurium, iron, sodium, selenium, bismuth, copper, mercury, magnesium, lead, tin, cadmium, arsenic, antimony, etc., or, equivalently, ammonium), $n$ is a number equal to the valence of the metal and R and R' are non-aromatic hydrocarbon moities. More particularly, R represents a linear, branched or "alpha-methyl substituted" alkyl radical of from seven to 30 carbon atoms, such as n-heptyl, 2-heptyl, 1,2-dimethylhexyl, 2,5-dimethylhexyl, n-nonyl, 1,5-dimethyloctyl, 3,5,5-trimethyldecyl, n-dodecyl, etc., and R' represents a secondary alkyl group or an alkyl substituted or non-substituted cycloalkyl radical of from three to nine carbon atoms. The following ranges for the number of carbon atoms in R and R' are of particular interest:

| | Broad | Preferred | Most Preferred |
|---|---|---|---|
| R | $C_7$–$C_{30}$ | $C_{12}$–$C_{20}$ | $C_{14}$–$C_{18}$ |
| R' alkyl | $C_3$–$C_9$ | $C_3$–$C_8$ | |
| cycloalkyl | $C_5$–$C_9$ | $C_5$–$C_6$ | |

An important aspect of the invention involves secondary alkyl substitution for R' as well as the most preferred $C_{14}$–$C_{18}$ range for R. Examples include zinc N-dodecyl-N-isopropyldithiocarbamate, ferric N-octyl-N-isopropyldithiocarbamate, selenium N-dodecyl-N-isopropyldithiocarbamate, sodium N-octadecyl-N-isopropyldithiocarbamate, tellurium N-octyl-N-2-hexyl-(or cyclohexyl-) dithiocarbamate, nickel N-dodecyl-N-2-hexyldithiocarbamate, copper N-octadecyl-N-3-hexyldithiocarbamate, magnesium N-n-(mixed $C_{16}$–$C_{18}$ alkyl)-N-isopropyldithiocarbamate, tin N-n-octadecyl-N-1,3-dimethylbutyldithiocarbamate, cadmium N-n-octadecyl-N-isopropyldithiocarbamate, zinc N-n-octyl-N-1,2-dimethylpropyl dithiocarbamate, etc.

The long chain hydrocarbon dithiocarbamate accelerators of the invention are prepared by reacting an appropriate amine with carbon disulfide in the presence of sodium hydroxide to produce first the sodium salt in accordance with the equation:

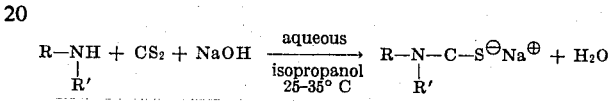

The reaction medium suitably comprises water and an alcohol, e.g., a $C_1$ – $C_4$ alkanol. If the finally desired salt is other than the sodium salt, then an appropriate salt of the desired metal (e.g., zinc sulfate when the finally desired dithiocarbamate is a zinc dithiocarbamate) is reacted (at a temperature of, for example, about 30° C) with the sodium salt formed above to produce such finally desired salt. The zinc sulfate or similar water soluble metal salt may be added to the sodium salt of carbamic acid or vice versa. The method of the invention has particular reference to the final salt formation step wherein the final salt is insoluble and precipitates out, as in the case of the zinc salt. In accordance with the invention, high speed agitation is employed in the final salt formation step. Rapid stirring has been found to be extremely important. If rapid agitation is not used the product has a tendency to "oil out" and eventually form a cake upon crystallization. When this happens impurities are entrapped and it is difficult to break up and purify the hard mass later on. The presence of impurities is easily recognizable by the tan color of the product, with the liquid (water-alcohol) phase being clear.

However, when high speed agitation is used, in accordance with the invention, throughout the zinc salt or other insoluble salt forming step and continued for an appropriate length of time (until the salt solidifies) thereafter the zinc or similar salt will crystallize with a small particle size whereas the liquid phase takes on an amberish color.

These small size product particles can easily be isolated and if necessary further washed and purified if so desired.

The improved purity of the product made according to the method of the invention reflects in the melting points and melting point ranges, as exemplified by the following data for zinc N-dodecyl-N-isopropyldithiocarbamate:

| | Melting Point |
|---|---|
| Without high speed agitation | 81–84°C. |
| With high speed agitation according to invention | 84–85°C. |

The following examples will serve to illustrate the practice of the invention in more detail.

EXAMPLE I

Preparation of zinc dodecylisopropyldithiocarbamate.

In a 2-liter, three-neck, round-bottom flask equipped with a stirrer, thermometer and dropping funnel is placed 60 grams (1.5 moles) of sodium hydroxide and 60 ml. of water (or 120 grams of 50 percent sodium hydroxide solution), 1,000 ml. of isopropanol and 341 gm. (1.5 moles) of N-n-dodecyl-N-isopropyl amine. To this stirred solution is added 126 gm. (1.66 moles, 100 ml.) of carbon disulfide at such a rate as to maintain the reaction temperature at 25°–35° C. After all of the carbon disulfide has been added the solution is poured into a rapidly stirring solution of 140 gm. of zinc sulfate in 1,000 ml. of water. The stirrer may have a screw-type propeller, four inches in diameter, with three vanes, rotating at 300–600 r.p.m. or more. The rapid stirring is continued until the zinc salt solidifies (rapid stirring is important, and will cause small particle size solidification of the zinc salt and prevents caking of the mixture thus entrapping impurities). This gives a compound with an easily filterable particle size. When the product solidifies it is removed by filtration and dried. The yield is 98 percent of a white solid, m.p. 84°–85° C.

The following dithiocarbamic acid zinc salts may be made by an analogous procedure to that above by substitution of the appropriate amine for N-n-dodecyl-N-isopropyl amine:

| Ex. | Dithiocarbamic acid salt | m.p. °C. |
|---|---|---|
| II | Zn N-n-octyl-N-isopropyl | 70–72 |
| III | Zn N-n-octyl-N-1,3-dimethylbutyl | 44–48 |
| IV | Zn N-n-dodecyl-N-isopropyl | 84–85 |
| V | Zn N-n-dodecyl-N-1,3-dimethylbutyl | 44–48 |
| VI | Zn N-n-dodecyl-N-cyclohexyl | 77–79 |
| VII | Zn N-n-octadecyl-N-isopropyl | 93–95 |
| VIII | Zn N-n-octadecyl-N-1,3-dimethylbutyl | 59–61 |
| IX | Zn N-n-(mixed $C_{16}$–$C_{18}$)-N-isopropyl | 79–85 |
| X | Fe(3)N-n-(mixed $C_{16}$–$C_{18}$)- N-isopropyl | 75–77 |
| XI | Pb -"- -"- | 77–78 |
| XII | Cr -"- -"- | 82–84 |
| XIII | Cu(2) -"- -"- | 73–74 |
| XIV | Na N-n-dodecyl-N-isopropyl | 69–71 |
| XV | Pb -"- -"- | 79–80 |
| XVI | Cu(2) -"- -"- | 77–78 |
| XVII | Fe(3) -"- -"- | ca. 25–35 |
| XVIII | Cr -"- -"- | 69–72 |
| XIX | Ni -"- -"- | 50–51 |
| XX | Cd -"- -"- | 69–72 |
| XXI | Pb N-n-octadecyl-N-isopropyl | 83–85 |
| XXII | Cu(2) -"- -"- | 83–84 |
| XXIII | Fe(3) -"- -"- | 92–95 |
| XXIV | Zn N-n-(mixed $C_{16}$–$C_{18}$)-N-cyclohexyl | 61–64 |

The mixed $C_{16}$–$C_{18}$ alkyl amines used in Example IX are a tallow amine product commercially available as Armeen T, or Armeen HT.

The secondary amines used in these preparations may be prepared by reductive alkylation of primary amines, with ketones, according to the equation:

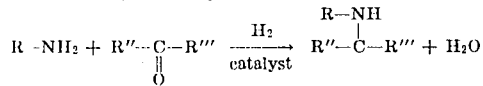

where typical values of R, R'' and R''' are:
R = n- or α - methyl substituted alkyl, $C_7$ – $C_{30}$
R'' = alkyl, $C_1$ – $C_{10}$
R''' = alkyl, $C_1$ – $C_{10}$ An alternate method for the preparation of the secondary amine intermediates is to react an alkenylamine with a ketone under the proper reaction conditions and in the presence of a suitable catalyst (e.g. palladium, platinum, nickel, etc.) and hydrogen because the internal double bond(s) will be hydrogenated simultaneously leading to the desired alkyl substitutions.

The long chain hydrocarbon dithiocarbamate accelerators of the invention have remarkable, unexpected advantages over short chain hydrocarbon dithiocarbamates when used in the sulfur cure of a blend of low unsaturation rubber (butyl, EPDM) with highly unsaturated rubber (e.g. NR, SBR, IR, BR, polychloroprene, or mixtures thereof). The accelerators of the invention yield co-cured blends having excellent physical properties and good adhesion to other stocks, such as conventional carcass stocks. Sidewalls or coverstrips for pneumatic tires, made of EPDM — highly unsaturated rubber blends co-cured with sulfur and accelerated with an accelerator of the invention have good resistance to ozone and to cracking, good physical properties, and good adhesion to the tire carcass. An example of a co-cure of a blend with an accelerator of the invention is as follows:

EXAMPLE XXV

The materials shown in Table 1 are blended together, in the amounts shown in the table, to make nine different stocks having various compositions. The stock identified as I represents the use of an accelerator of the invention in a blend; stocks A to H are included for comparison. The EPDM employed is an ethylene-propylene-5-ethylidene-2-norbornene terpolymer containing 43 percent propylene by weight, iodine number 20, Mooney viscosity 75 (ML–4 at 212° F.). The highly unsaturated rubber employed is a styrene-butadiene copolymer rubber, SBR 1502, containing about 23 percent styrene. The extender oil is Circosol 4240. The accelerators are employed at equivalent molecular quantities (i.e., 0.00164 moles/100 gr of blend). The stocks are cured in a mold at 320° F for 20 minutes and 30 minutes, and the physical properties are determined, with the results shown in the table. The tensile properties of the blended rubbers cured using the accelerator of the invention, namely zinc dodecylisopropyl-dithiocarbamate, stock I, are far superior to the tensile properties of blends made with conventional accelerators, stocks C and F.

TABLE I

[Comparison of long chain hydrocarbon dithiocarbamate accelerators to short chain dithiocarbamate accelerators in blends of SBR and EPDM]

| | Cure time | A | B | C | D | E | F | G | H | I |
|---|---|---|---|---|---|---|---|---|---|---|
| EPDM | | 100.0 | | 50.0 | 100.0 | | 50.0 | 100.0 | | 50.0 |
| SBR | | | 100.0 | 50.0 | | 100.0 | 50.0 | | 100.0 | 50.0 |
| Carbon black | | 80.0 | 80.0 | 80.0 | 80.0 | 80.0 | 80.0 | 80.0 | 80.0 | 80.0 |
| Extender oil | | 50.0 | 50.0 | 50.0 | 50.0 | 50.0 | 50.0 | 50.0 | 50.0 | 50.0 |
| Zinc oxide | | 5.0 | 5.0 | 5.0 | 5.0 | 5.0 | 5.0 | 5.0 | 5.0 | 5.0 |
| Stearic acid | | 0.75 | 0.75 | 0.75 | 0.75 | 0.75 | 0.75 | 0.75 | 0.75 | 0.75 |
| Zinc dimethyldithiocarbamate | | 0.5 | 0.5 | 0.5 | | | | | | |
| Zinc dibutyldithiocarbamate | | | | | 0.63 | 0.63 | 0.63 | | | |
| Zinc dodecylisopropyldithiocarbamate | | | | | | | | 1.10 | 1.10 | 1.10 |
| Sulfur | | 2.5 | 2.5 | 2.5 | 2.5 | 2.5 | 2.5 | 2.5 | 2.5 | 2.5 |
| Physical properties after cure at 320° F. | | | | | | | | | | |
| 300% modulus, p.s.i. | 20' | 1,020 | 1,400 | | 790 | 1,000 | | 700 | 990 | 1,410 |
| | 30' | 1,220 | 1,580 | | 990 | 1,190 | | 980 | 1,190 | 1,600 |
| Tensile strength, p.s.i. | 20' | 2,200 | 2,050 | 1,250 | 1,800 | 1,900 | 1,100 | 1,750 | 1,990 | 1,610 |
| | 30' | 2,300 | 2,050 | 1,280 | 2,190 | 1,990 | 1,400 | 2,180 | 2,150 | 1,680 |
| Elongation, percent | 20' | 650 | 460 | 250 | 800 | 640 | 250 | 780 | 640 | 390 |
| | 30' | 590 | 430 | 230 | 680 | 540 | 290 | 630 | 580 | 340 |

Further details on use of the accelerators of the invention are given in the co-pending application of Mastromatteo and Brett referred to above.

Having thus described out invention, what we claim and desire to protect by Letters Patent is:

1. A long chain hydrocarbon dithiocarbamate of the formula

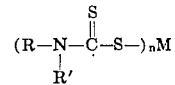

where M is a metal, n is a number equal to the valence of the metal, R is a linear, branched or alpha-methyl substituted alkyl radical of from seven to 30 carbon atoms, and R' is a secondary alkyl group or an alkyl substituted or unsubstituted cycloalkyl radical of from three to nine carbon atoms.

2. A dithiocarbamate as in claim 1 wherein R has from 12 to 20 carbon atoms.

3. A dithiocarbamate as in claim 1 wherein R has from 14 to 18 carbon atoms.

4. A dithiocarbamate as in claim 1 in which R' is a secondary alkyl group having from three to nine carbon atoms.

5. A dithiocarbamate as in claim 1 in which R' is a secondary alkyl group having from three to six carbon atoms.

6. A dithiocarbamate as in claim 1 in which R' is a cycloalkyl group having from five to nine carbon atoms.

7. A dithiocarbamate as in claim 1 in which R' is a cycloalkyl group having from five or six carbon atoms.

8. A dithiocarbamate as in claim 1 in which R has from 14 to 18 carbon atoms and R' is a secondary alkyl group having three to six carbon atoms.

9. A dithiocarbamate as in claim 1 in which M is zinc.

10. A dithiocarbamate as in claim 8 in which M is zinc.

11. A dithiocarbamate as in claim 1 which is zinc N-n-dodecyl-N-isopropyldithiocarbamate.

12. A dithiocarbamate as in claim 1 which is zinc N-n-octyl-N-isopropyldithiocarbamate.

13. A dithiocarbamate as in claim 1 which is zinc N-n-octyl-N-1,3-dimethylbutyldithiocarbamate.

14. A dithiocarbamate as in claim 1 which is zinc N-n-dodecyl-N-1,3-dimethylbutyldithiocarbamate.

15. A dithiocarbamate as in claim 1 which is zinc N-n-dodecyl-N-cyclohexyldithiocarbamate.

16. A dithiocarbamate as in claim 1 which is zinc N-n-octadecyl-N-isopropyldithiocarbamate.

17. A dithiocarbamate as in claim 1 which is zinc N-n-octadecyl-N-1,3-dimethylbutyldithiocarbamate.

18. A dithiocarbamate as in claim 1 which is zinc N-n-(mixed $C_{16}$–$C_{18}$)-N-isopropyldithiocarbamate.

19. A dithiocarbamate as in claim 1 which is ferric N-n-(mixed $C_{16}$–$C_{18}$)-N-isopropyldithiocarbamate.

20. A dithiocarbamate as in claim 1 which is lead N-n(mixed $C_{16}$–$C_{18}$)-N-isopropyldithiocarbamate.

21. A dithiocarbamate as in claim 1 which is chromium N-n(mixed $C_{16}$–$C_{18}$)-N-isopropyldithiocarbamate.

22. A dithiocarbamate as in claim 1 which is copper N-n(mixed $C_{16}$–$C_{18}$)-N-isopropyldithiocarbamate.

23. A dithiocarbamate as in claim 1 which is sodium N-n-dodecyl-N-isopropyldithiocarbamate.

24. A dithiocarbamate as in claim 1 which is lead N-n-dodecyl-N-isopropyldithiocarbamate.

25. A dithiocarbamate as in claim 1 which is copper N-n-dodecyl-N-isopropyldithiocarbamate.

26. A dithiocarbamate as in claim 1 which is ferric N-n-dodecyl-N-isopropyldithiocarbamate.

27. A dithiocarbamate as in claim 1 which is chromium N-n-dodecyl-N-isopropyldithiocarbamate.

28. A dithiocarbamate as in claim 1 which is nickel N-n-dodecyl-N-isopropyldithiocarbamate.

29. A dithiocarbamate as in claim 1 which is cadmium N-n-dodecyl-N-isopropyldithiocarbamate.

30. A dithiocarbamate as in claim 1 which is lead N-n-octadecyl-N-isopropyldithiocarbamate.

31. A dithiocarbamate as in claim 1 which is copper N-n-octadecyl-N-isopropyldithiocarbamate.

32. A dithiocarbamate as in claim 1 which is ferric N-n-octadecyl-N-isopropyldithiocarbamate.

33. A dithiocarbamate as in claim 1 which is zinc N-n-(mixed $C_{16}$–$C_{18}$)-N-cyclohexyldithiocarbamate.

34. A method comprising mixing a water-alcohol solution, the said alcohol being an alkanol having from one to four carbon atoms, of a chemical as in claim 1 wherein M is sodium with a water-soluble metal salt of a metal which forms an insoluble salt with the dithiocarbamate moiety represented in claim 1, characterized in that the mixture is subjected to high speed agitation by the action of a propeller blade rotating at a speed of at least 300 revolutions per minute, whereby an insoluble metal dithiocarbamate of said formula precipitates in finely divided solid form substantially free of occluded impurities, and thereafter recovering said precipitate from the mixture, the said high speed agitation being used throughout the step of forming the said insoluble metal dithiocarbamate and being continued until the insoluble metal dithiocarbamate solidifies.

35. A method as in claim 34 in which said water-soluble salt is zinc sulfate and the precipitated salt is a zinc dithiocarbamate of the said formula.

* * * * *